United States Patent [19]

Winters

[11] Patent Number: 4,541,402

[45] Date of Patent: Sep. 17, 1985

[54] LIVESTOCK MARKER

[76] Inventor: Bobby J. Winters, P.O. Box 30054, Amarillo, Tex. 79120

[21] Appl. No.: 657,622

[22] Filed: Oct. 4, 1984

[51] Int. Cl.⁴ ............................................... F41B 15/00
[52] U.S. Cl. ....................................... 124/27; 40/2 R; 40/300; 40/594; 273/347; 156/579
[58] Field of Search ............... 156/230, 247, 289, 344, 156/579; 124/16, 27; 273/348, 347; 40/2, 594, 610, 584, 300

[56] References Cited

U.S. PATENT DOCUMENTS

| | | | |
|---|---|---|---|
| 2,118,368 | 5/1938 | Tyller | 273/420 |
| 2,321,077 | 6/1943 | Gora et al. | 124/16 |
| 2,777,436 | 1/1957 | Renner | 124/27 |
| 3,147,011 | 9/1964 | Lemelson | 273/418 |
| 3,399,478 | 9/1968 | Tarver | 40/300 |
| 4,195,615 | 4/1980 | Belokin | 124/16 |
| 4,214,490 | 7/1980 | Chizek | 40/300 |
| 4,386,478 | 6/1983 | Belokin | 124/16 |
| 4,450,649 | 5/1984 | Dunwoody | 124/16 |

FOREIGN PATENT DOCUMENTS 643556 9/1928 France ............................... 273/348

Primary Examiner—Gene Mancene
Assistant Examiner—Wenceslao J. Contreras
Attorney, Agent, or Firm—Wendell Coffee; Montgomery W. Smith

[57] ABSTRACT

A flat tag has a marking on an outside surface, and adhesive on an inside surface that will adhere the tag to an animal. The tag is mounted on a dart with the outside surface against a disc and an end of the dart. A gun, preferably spring actuated, propels the dart, disc first, 10 to 30 feet to impact on a target animal. After the tag is adhered to the animal, the dart disengages from the tag. The tag is mounted on the disc with tabs of the tag folded around the disc, or with adhesive.

14 Claims, 10 Drawing Figures

LIVESTOCK MARKER

BACKGROUND OF THE INVENTION (1) Field of the Invention

This invention relates to livestock, and especially to the identification of livestock.

(2) Description of the Prior Art

It is often necessary to mark livestock for identification. Some extremely old methods include: removing part of an ear, and branding the animal's hide with a hot iron. Other common marking methods include: ear tags, dye or paint, nose tags, collars, and adhesive stickers, to mention a few. In order to perform such methods, the person doing the marking must be able to touch the animal, except as discussed below.

There are many instances in which livestock, such as cattle, are free on open range or in large pastures. It is ordinarily impossible to get close enough to livestock in such situations to reliably mark them. The selected animals must either be caught in the open, or driven to a pen where they can be approached more closely, to mark them.

Before my invention, $CO_2$ cartridge type pistols that shot a paint capsule which broke and spattered colored paint on selected animals, permitted marking animals from a distance. This paint spatter method resulted only in color marking the animals, but did not further identify the marked animals with symbols, writing, letters, numerals, or any other distinct identifying marking.

Before filing this application, a search was made in the U.S. Patent and Trademark Office. That search developed the following U.S. Patents:
  RENNER, U.S. Pat. No. 2,777,436
  RULE, U.S. Pat. No. 3,076,431
  BELOKIN, U.S. Pat. No. 4,195,615

The above patents are cited because applicant believes the Examiner might regard the results of a search by an experienced searcher to be relevant and pertinent to the examination of this application.

SUMMARY OF THE INVENTION (1) New Function and Surprising Results

The primary problem associated with marking livestock for identification is getting close enough to the animal to do so by hand. It is frequently necessary to place a number or other identifiable and distinguishable symbol on an animal. This is not accomplished with the paint capsule shot from a distance, because no symbol or other distinct mark, other than color, is placed on the animal. The paint shooting device does allow limited marking of animals with paint from a distance.

My invention permits marking of animals with symbols, numbers, or other type identification at a sensible distance of from 10 to 30 feet. A marking device and method according to my invention is to attach to disc at the end of a dart or other projectile that is fired or propelled from a launcher or gun. An appropriate tag is removably attached to a face of the disc and has an adhesive on a forward facing inside surface that is to strike an animal.

The adhesive sticks the tag to the animal, and the readily detachable dart falls to the ground. When the dart falls off, the number or other distinct, identifying symbol on the outside surface of the flat, sheet-like tag is readily visible. The tag may also be of different shapes, such as round, square, triangular, or pentagonal, to mention a few possibilities.

The tag could contain chemicals to repel insects or other pests on the animals. One benefit of using the tags for dispensing pest control chemicals is that it is easy to tell with the tags which animals have been done.

Another advantage of the tags is that they are semi-permanent. There is no need to catch the animal to remove the tag, since it will eventually come off. However, experience has shown that the tags are also durable, ordinarily lasting at least two weeks.

I prefer to use tabs of the tag, folded around the disc periphery to retain and align the tag on the disc. However, adhesive may be used to retain the tag on the disc, as well as other mounting structures that attach the tag to the dart end sufficiently for flight to the animal, but being easily disengagable after impact.

I also prefer to use a spring actuated gun that does not consume explosive or compressed gas, although any gun or propelling means could be used with a suitable projectile according to my invention.

(2) Objects of this Invention

An object of this invention is to mark animals for identification.

Further objects are to achieve the above with a device that is sturdy, compact, durable, lightweight, simple, safe, efficient, versatile, ecologically compatible, energy conserving, and reliable, yet inexpensive and easy to manufacture, adjust, operate and maintain.

Other objects are to achieve the above with a method that is versatile, ecologically compatible, energy conserving, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENTS

Figure 1:
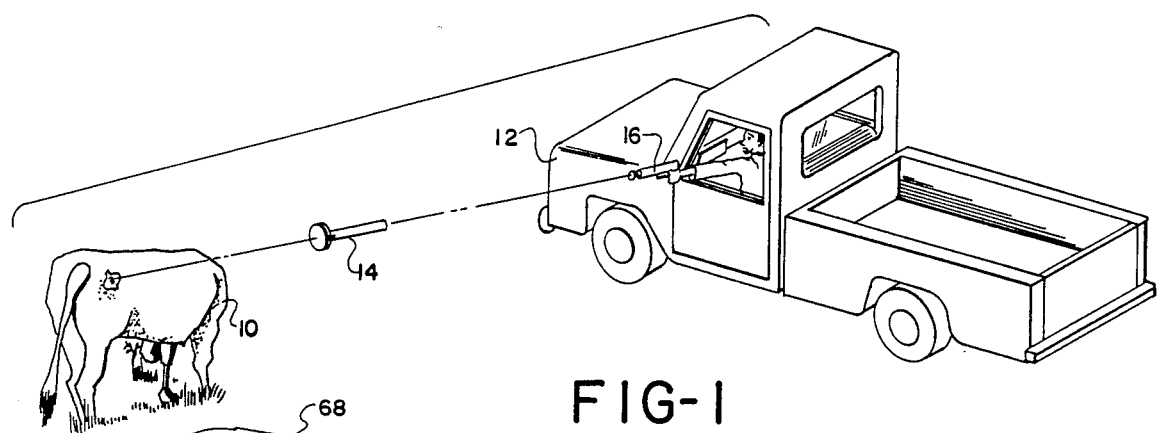
FIG. 1 is a somewhat schematic representation of a tagging dart according to my invention being fired from a pickup to impact on a cow.

A livestock marker according to my invention is used with livestock, typified by cow 10 shown in FIG. 1. A person desiring to mark the animal in an open field or pasture, transported in pickup 12, fires tag assembly 14 from gun 16 at a convenient distance of between 10 and 30 feet from the cow 10.

Figure 2:
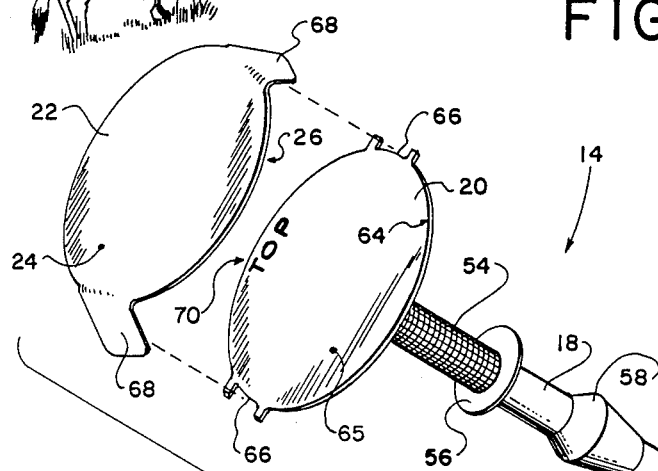
FIG. 2 is an exploded view of a tag and dart according to my invention.

The tag assembly 14, shown in FIG. 2, includes dart 18, and disc 20 attached at an end of the dart 18, and tag 22. The tag 22 is mountable on, or attachable to the disc 20, which has substantially the same shape and size as the tag 22. The tag 22 is preferably made of sheet-like material, and has an inside side or surface 24 and an outside side or surface 26. The inside surface 24 has adhesive thereon.

The adhesive on the inside surface 24 may be applied, for example, from a tube, like toothpaste, onto the disc, or tag inside surface 24, just before firing or loading the dart, or the adhesive may be preaffixed to the tag inside surface 24 protected by a sheet which is peeled away prior to firing. The adhesive on the inside surface is preferably specially adapted to adhere the tag to an animal the tag is contacted with, but not harmful to the animal. Such adhesives are well known in the livestock handling art.

The outside surface 26 will be on that side of the tag facing the disc 20 when the tag is mounted thereon, and will show when the inside surface 24 is adhered to the animal.

As described above, the outside surface 26 may have symbols, numbers, letters, different colors, chemical compounds, and the like thereon, as desired by the operator of the marking system. The outside surface 26 could also be light reflective to facilitate finding and checking sick cattle at night.

Figure 3:
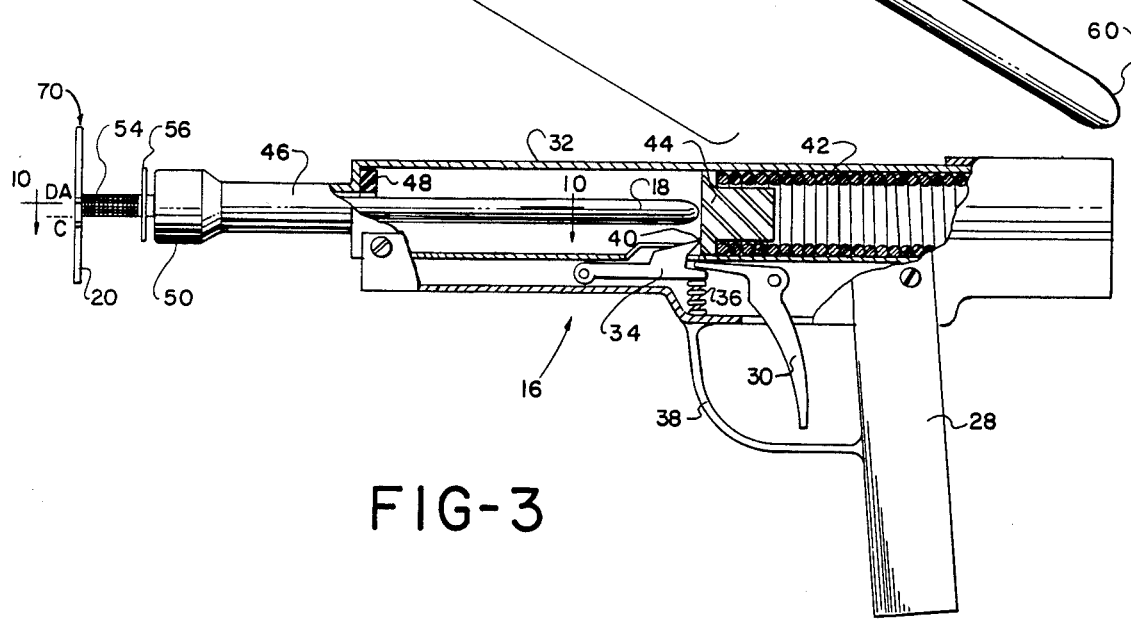
FIG. 3 is side elevation view of a gun and dart according to my invention.

Referring to FIG. 3, the gun 16 may be seen to include handle 28, trigger 30, large barrel 32, catch 34, catch spring 36 biasing the catch 34 toward the large barrel, and springably bearing catch edge 40 of the catch 34 into the bore of the large barrel 32. Trigger guard 38 prevents accidental actuation of the trigger 30. Power compression spring 42 is abutted against one end of the large barrel 32, and springably forces plunger 44 within the bore of the large barrel 32. The large barrel bore is slightly larger in diameter than the plunger 44.

Small barrel 46 extends from the end of the large barrel 32 opposite the spring 42. The small barrel 46 has a bore that is smaller in diameter than the plunger 44, and slightly larger in diameter than the dart 18. The small barrel 46 is adapted to guide the dart 18 during its initial travel for a predictable aimed flight or trajectory after it leaves the small barrel.

Shock absorber 48, within the large barrel 32 bore, adjacent the connection of the small and large barrel bores, cushions or absorbs the force of the plunger when its travel is arrested against the large barrel end. The shock absorber 48 is preferably made of rubber or other resilient, durable compound.

The small barrel 46 has a muzzle 50 with a bore at an end thereof, opposite the shock absorber 48. A tapered, beveled, or constricting bore extends from the bore of the muzzle 50 to the bore of the small barrel 46. The muzzle 50 provides room for retaining clips 52, which will be described in more detail later. The tapered bore guides dart tip 60 into the small barrel bore and thence into the large barrel bore to abut against the plunger 44.

Referring again to FIG. 2, the dart 18 may be seen to further include grip area 54 between the disc 20 and dart ring 56 attached about and encircling the dart 18. Retaining shoulder 58 is between the ring 56 and the dart tip 60 opposite the disc 20. The shoulder 58 may be substantially any shape so long as it is a somewhat smooth, rounded, or beveled projection from the preferably smooth and parallel dart 18 sides.

A portion of the dart from the ring 56 to the tip or end opposite the disc 20 is inserted in the small and large barrel bores, with the tip 60 abutted against the plunger 44 such that as the dart 18 is inserted or telescoped further into the barrels, the tip 60 pushes the plunger 44 past the catch edge 40, whereupon the catch spring 36 biases the catch edge 40 in front of the plunger, retaining it in a cocked position.

The ring, and the roughened grip area 54 of the dart 18, provide a convenient finger grip or hold for the insertion of the dart 18, and the compression of the power spring 42.

Figure 10:
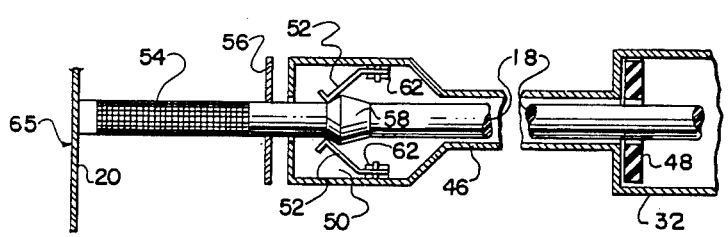
FIG. 10 is a top section view taken substantially along line 10—10 of FIG. 3.

Referring to FIG. 10, the retaining clips 52 are preferably mounted in the muzzle 50 at clip mounts 62. The ends of the clips 52 are springably biased against the dart 18 sides in front of the beveled or sloped surface of the preferred shoulder 58 to prevent the dart from sliding out of the gun under the force of gravity. The power spring 42 can easily force the shoulder 58 past the retaining clips 52 to project the tag assembly 14 from the gun 16 the desired distance of more than 10 feet. The clips can be metal, or cast in plastic, with the barrel 46.

Thus, when the gun is fired or released or actuated by pulling the trigger to disengage the catch from the plunger 44, the power spring 42 will snap the plunger within the bore of the large barrel against the tip 60, thrusting the dart 18 from the large and small barrels toward the target animal.

Of course, guns having structure and propulsion means other than those described above could be used within the scope of my invention. I prefer to use the spring activated gun because it is convenient, inexpensive to operate, does not require renewal of explosive or gas cartridges.

I also prefer to construct the gun with the retaining clips 52 in order to permit removal of the dart 18 from the gun while it is still cocked by simply pulling the shoulder 58 past the clips 52 by hand. This feature prevents or reduces the risk of accidents due to accidental misfiring if the gun is not able to be fired at a target animal when originally cocked or loaded with the dart. Although not shown in the figures, the gun 16 would also have the appropriate safety catches to help prevent accidental firings or propulsion of the dart.

Figure 4:
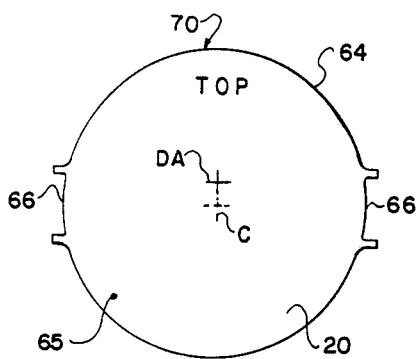
FIG. 4 is an end view of the disc of FIG. 2.
Figure 5:
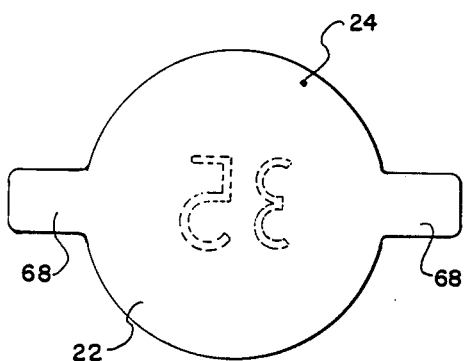
FIG. 5 is a plan view of the tag of FIG. 2.

Referring to FIGS. 4 and 5, the disc 20 is circular in shape for this embodiment, and has disc or mount periphery 64 of disc face 65, and slots 66 at the periphery. The tag 22 preferably has tabs 68 extending therefrom, preferably composed of and cut from the same sheet material as the remainder of the tag.

The tag 22 is mounted on the disc 20 by positioning the tag on the disc face 65, with the tag upright with respect to the word "TOP" preferably imprinted at a top of the disc face 65, described later. The tabs are aligned with the slots, and then bent into the slots and around the periphery 64. It is preferred that the tabs be bent so that they are straight back, or parallel with the dart 18. This retains the tag on the dart during flight, but permits the weight of the dart to pull the disc away from the tag once the tag is adhered to the animal.

FIG. 5 shows the tag 22 with the inside surface up, and a number 35, shown by dashed lines as a mirror image, on the outside surface. The number 35 is shown in its upright position on the animal marked in FIG. 9, where the inside surface of the tag 22 has been impacted with the animal, and adhered thereto.

Figure 6:
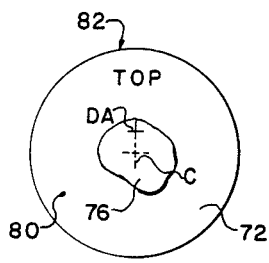
FIG. 6 is an end view of another embodiment of a disc according to my invention.
Figure 7:
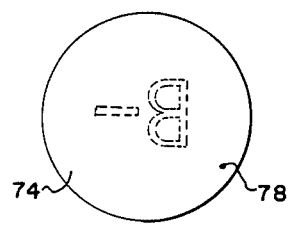
FIG. 7 is a plan view of another embodiment of a tag according to my invention, for use with the disc shown in FIG. 6.
Figure 8:
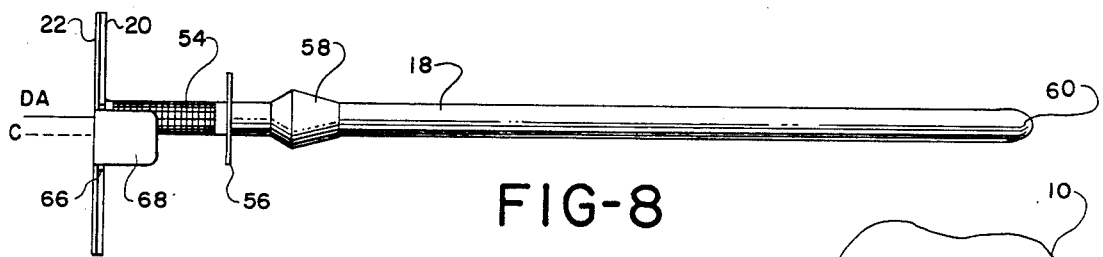
FIG. 8 is a side elevation view of the disc and tag shown in FIG. 2.

FIGS. 6 and 7 show another embodiment of my invention, wherein adhesive 76 is employed as retaining means or mounting structure for retaining or mounting tag 74 on disc 72. FIG. 7 shows inside surface 78 of the tag 74 with the symbol "B-", or B bar, marked on opposite, outside surface 84, shown in mirror image with dashed lines. The outside surface is adhered to disc face 80 with the adhesive 76.

The embodiment shown in FIGS. 6 and 7 illustrates a one inch diameter disc according to my invention for use with smaller animals, or with small tags, as opposed to the two inch diameter large tag shown in the remaining figures. It may be necessary, for convenience of operation, that the ring 56 not be included on darts with the smaller disc 72. Of course almost any size disc may be used with a similarly sized tag and still be within the scope of my invention.

Figure 9:
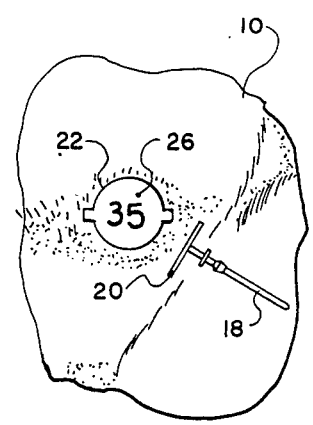
FIG. 9 is a perspective view of a tag attached to an animal, and the disconnection of the disc therefrom.

Referring to FIGS. 4 and 6, the discs 20 and 72 may be seen to have tops 70 and 82, respectively, preferably labeled "TOP" for easy reference. The discs 20 and 72 also have a center, "C", preferably the center of mass thereof, shown as the dotted centerline "C" in FIGS. 4 and 6. The connection of the dart 18 to the disc 20 or 72 is off-centered toward the top 70 or 82 from the disc center "C", such that an axis through the dart 18, designated with the letters "DA" in the figures, is off-centered toward the top of the disc 20 or 72. This off-centering provides for substantially nonspinning flight of the discs 20 and 72, and makes it more likely that the tag will adhere in a desired orientation, that is, the disc impacts the tag with the "TOP" of the disc upright. For example, if the top of the symbols, numbers, or letters on the tag are positioned adjacent, or at, the top of the disc, the letters, symbols, or numbers, will appear upright and legible when the tag is impacted on the animal, as shown in FIG. 9.

Having described the structure of a livestock marking system according to my invention, a method for using the marking structure is as follows. The operator of the livestock marker is placed within range of the animals to be marked, such as by pickup or horseback, preferably within 10 to 30 feet. The operator inserts a dart into the gun, grasping the ring 56 or grip area 54, inserting the tip 60 into the muzzle, forcing the tip 60 of the dart 18 through the small barrel bore into the large barrel bore of the gun, and compressing the power spring 42 with the plunger 44 until the plunger is caught by the catch 34. A tag may have been mounted prior to loading the dart, or after loading the dart, as desired.

For the tabbed tag embodiment, the tag 22 is positioned on the disc, the tabs 68 are aligned with the slot and the top of the tag 22 is aligned with the top 70 of the disc. The tabs 68 are then folded straight back around the periphery 64 within the slots 66.

For the adhesive mounted tags, adhesive would be applied to either the tag 74 or the disc 72, or a protective backing would be peeled from the tag outside surface to adhere the tag to the disc. The tag would be similarly aligned and positioned, with the tag oriented upright with respect to the disc top 82, as desired, during the adherance or gluing of the tag to the disc.

At this point, the adhesive on the inside surface is preferably exposed or applied, although this could be done at any time before firing the dart 18. The tag will be more easily handled, more easily mounted on the disc, and the dart more easily loaded into the gun, if the inside surface is not sticky or messy. A protective backing could be removed to expose a manufacturer-applied livestock adhesive, on the tag inside surface, or adhesive could be applied to the tag by the person using the livestock marker from a tube or bottle of adhesive, before firing.

With the tag mounted, the dart loaded, the gun cocked, and the target animal within 30 feet, the gun is aimed and fired or actuated at the target animal. The gun is fired or actuated by pulling the trigger, thereby releasing the plunger 44 and propelling the dart, tag-first or disc-first, toward the selected animal. The tag will impact on the animal's body, adhering the tag to the animal.

The adhesive is preferably selected so that the adhesive will adhere the tag to the animal to a much greater extent than the tabs will retain the disc on the tag, or the retaining adhesive will adhere the disc to the tag. Regardless of the retaining or mounting structure used, the final step is the release of the disc from the tag. With the tag thus affixed to the animal upright as desired, the number, symbol, or letter, etc. may be easily read.

It will be understood that the term gun as used herein refers to any device adapted to hurl, project, throw, or otherwise bring the disc and tag retained thereon tag first against or impacting on an animal at least 10 feet from the projecting or throwing device. Such a gun could use explosive gases, controllably released gases such as from $CO_2$ cartridges, tension springs, and the like and still be within the scope of my invention.

It will also be understood that the term tag as used herein includes virtually any identifying sheet-like structure such that the term sheet also includes items that are not completely flat but that have at least one somewhat flat surface adapted to adhere with adhesive to an animal's hide. Although not all inclusive, a tag may include an outside surface that is not flat, but convex, tetrahedral, bumpy, or roughened for example.

The disc could be dipped or pressed against paint or another colored substance that would adhere to the animal. The shape of the disc could be varied to paint a symbol or brand, if desired, upon impact with the animal.

Thus, it may be seen that the livestock marker according to my invention facilitates the marking of livestock with identifiable symbols to a much greater extent than was possible with the prior art.

As an aid to correlating the terms of the claims to the exemplary drawing, the following catalog of elements is provided:

| Catalog of Elements | |
|---|---|
| 10 cow | 38 trigger guard |
| 12 pickup | 40 catch edge |
| 14 tag assembly | 42 power spring |
| 16 gun | 44 plunger |
| 18 dart | 46 small barrel |
| 20 disc | 48 shock absorber |
| 22 tag | 50 muzzle |
| 24 inside surface | 52 clips |
| 26 outside surface | 54 grip area |
| 28 handle | 56 dart ring |
| 30 trigger | 58 shoulder |
| 32 large barrel | 60 tip |
| 34 catch | 62 clip mounts |
| 36 catch spring | 64 disc periphery |
| 65 disc face | |
| 66 slots | |
| 68 tabs | |
| 70 disc top | |

| Catalog of Elements |
| --- |
| 72 disc (small) |
| 74 tag (small) |
| 76 adhesive |
| 78 inside surface |
| 80 disc face |
| 82 disc top |

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by an defined in the following claims. The restrictive description and drawing of the specific example above do not point out what an infringement of this patent would be, but are to enable the reader to make and use the invention.

I claim as my invention:

1. A device for use with livestock, comprising:
   a. a tag, being a sheet of material, having
   b. a tag periphery,
   c. an inside surface, and
   d. an outside surface,
   e. adhesive on the inside surface adapted to adhere the tag to an animal,
   f. a dart,
   g. a disc on one end of the dart,
   h. a face of the disc being about the same size and shape as the tag,
   i. retaining means associated with the device for holding the outside surface of the tag against the disc mounting face until the inside surface of the tag impacts on an animal,
   j. a gun adapted to propel the dart, disc first, a distance of at least 10 feet.

2. The invention as defined in claim 1 including the following limitations (a) through (j) with the addition of the following limitations:
   k. the disc having
   l. a center of mass, and
   m. a top of periphery of the disc face,
   n. the connection of the disc to the dart being off-centered of the disc center of mass, toward the disc top.

3. The invention as defined in claim 1 including the following limitations (a) through (j) with the addition of the following limitation:
   k. said retaining means being in the form of adhesive for adhering the outside surface of the tag to the disc face.

4. The invention as defined in claim 1 including the following limitations (a) through (j) with the addition of the following limitations:
   k. at least two tabs of the tag extending past a periphery of the disc face when the tag is positioned thereon,
   l. said retaining means being in the form of the tabs folded around the disc face periphery.

5. The invention as defined in claim 4 including the following limitations (a) through (l) with the addition of the following limitation:
   m. at least two slots of the disc periphery positioned for receiving the tag tabs when a top of the tag is aligned with a top of the disc face.

6. The invention as defined in claim 1 including the following limitations (a) through (j) with the addition of the following limitations:
   k. the dart being elongated,
   l. the gun having a barrel with a bore adapted to receive the dart,
   m. propulsion means associated with the gun for propelling the dart from the barrel bore, disc first, at least ten feet.

7. The invention as defined in claim 6 including the following limitations (a) through (m) with the addition of the following limitations:
   n. a shoulder on the dart,
   o. retaining clips in the barrel bore for engaging the shoulder to prevent the dart from failing out of the barrel bore that are disengagable when the gun is actuated to propel the dart.

8. A method for use with livestock, comprising the steps of:
   a. inserting a dart into a gun,
   b. mounting a tag on a disc at one end of the dart,
   c. aiming the gun at an animal,
   d. propelling the dart, tag first, toward the animal,
   e. impacting an inside surface of the tag against the animal,
   f. adhering the tag to the animal,
   g. releasing the disc from the tag.

9. The invention as defined in claim 8 including the following limitations (a) through (g) with the addition of the following limitation:
   h. marking an outside surface of the tag, opposite the inside surface, with an identification symbol.

10. The invention as defined in claim 8 including the following limitations (a) through (g) with the addition of the following limitations:
    h. performing the mounting step "b" by
    i. applying adhesive between the disc and an outside surface of the tag, opposite the inside surface, to adhere the tag to the disc.

11. The invention as defined in claim 8 including the following limitations (a) through (g) with the addition of the following limitations:
    h. performing the mounting step "b" by
    i. positioning an outside surface of the tag opposite the inside surface against the disc,
    j. aligning tabs of the tag with slots at a periphery of the disc,
    k. folding the tabs within the slots.

12. The invention as defined in claim 8 including the following limitations (a) through (g) with the addition of the following limitations:
    h. preparing the inside surface of the tag so that it will adhere to an animal if impacted therewith,
    i. aligning the tag on the disc face.

13. The invention as defined in claim 12 including the following limitations (a) through (i) with the addition of the following limitations:
    j. performing the preparing step h by
    k. peeling a backing from the inside surface of the tag to expose a preapplied adhesive.

14. The invention as defined in claim 12 including the following limitations (a) through (i) with the addition of the following limitations:
    j. performing the preparing step "h" by
    k. applying adhesive to the inside surface of the tag.

* * * * *